(No Model.) 2 Sheets—Sheet 1.
J. R. PHELPS.
LEG SPREADER FOR HORSES.
No. 480,625. Patented Aug. 9, 1892.
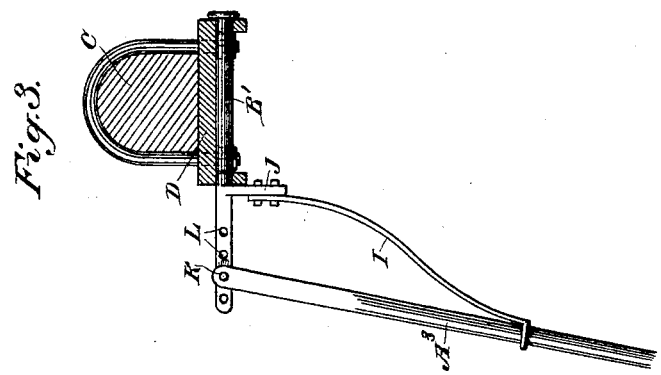
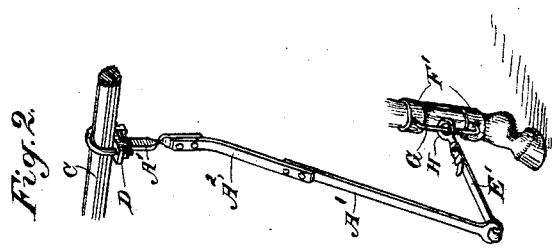
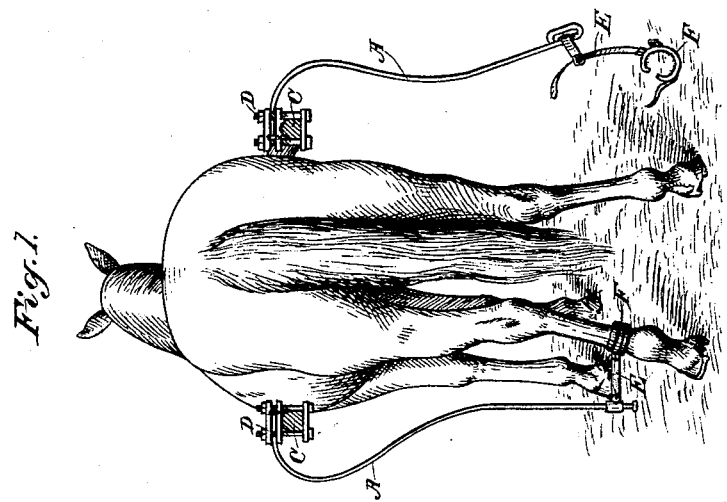
Witnesses,
Inventor,
James R. Phelps
By Dewey & Co.
Attys (No Model.) 2 Sheets—Sheet 2.

J. R. PHELPS.
LEG SPREADER FOR HORSES.

No. 480,625. Patented Aug. 9, 1892.

Witnesses,

Inventor,
James R. Phelps
By Dewey & Co.
Attys.

UNITED STATES PATENT OFFICE.

JAMES R. PHELPS, OF SACRAMENTO, CALIFORNIA.

LEG-SPREADER FOR HORSES.

SPECIFICATION forming part of Letters Patent No. 480,625, dated August 9, 1892.

Application filed August 1, 1891. Serial No. 401,402. (No model.)

*To all whom it may concern:*

Be it known that I, JAMES R. PHELPS, a citizen of the United States, residing at Sacramento, Sacramento county, State of California, have invented an Improvement in Devices for Gaiting Horses; and I hereby declare the following to be a full, clear, and exact description of the same.

My invention relates to a device and appliance for gaiting horses; and it consists of steel or other elastic arms attached to the shaft of the vehicle or attachments thereto, said springs having a journal attachment so that the lower ends are allowed to move in conjunction with the movement of the horse's legs with which they are connected so as to produce an outward pull thereon.

Figure 4:
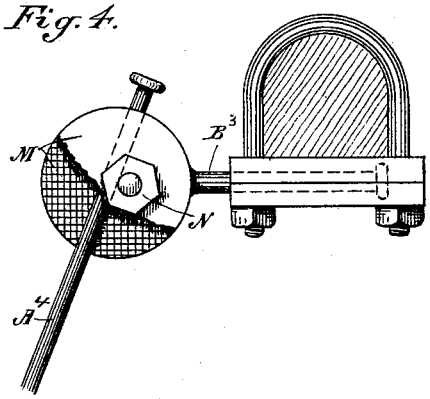
Figure 5:
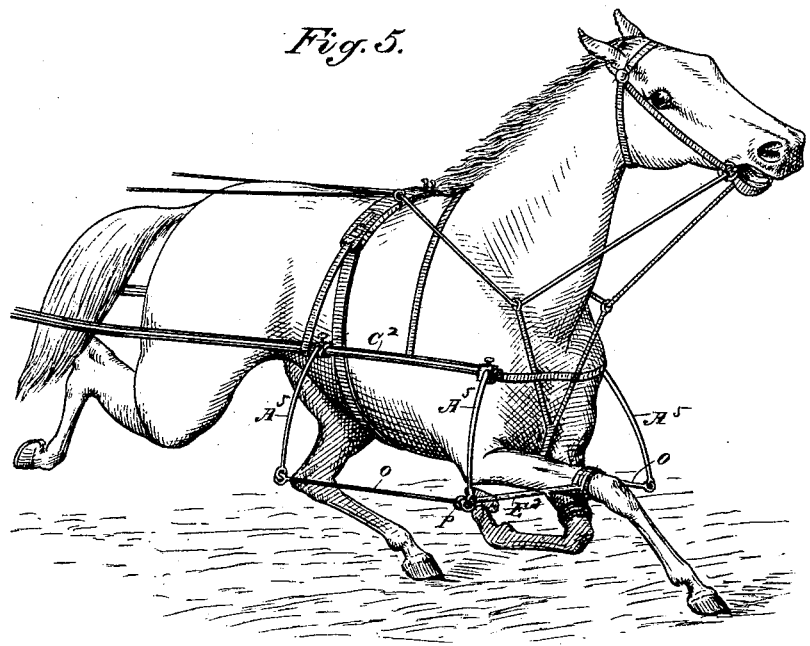

Referring to the accompanying drawings for a more complete explanation of my invention, Figure 1 is a rear view showing the shafts and the springs, one connected with the horse's foot and the other disconnected. Figs. 2, 3, and 4 are modifications of my device. Fig. 5 is a view of a horse, showing one way of application to the front legs.

In my former application for a patent allowed to me June 27, 1891, I have shown elastic arms journaled to a framework supported from the harness upon the back of the horse and having the lower ends connected with the legs of the horse, so that the outward pull or tension of the springs will act to spread the horse's legs and thereby improve his gait.

In my present invention A A are arms having horizontal journals B by which they are connected with the shaft C. These journals turn in boxes D, which are suitably clamped or secured to the shafts in the proper relative position to either front or hind legs to which the device is to be applied.

In Fig. 1 I have shown the arms A made of elastic steel properly curved and having at the lower ends the straps E, connecting them with suitable boots F, which are fitted to the horse's legs at any suitable or desired point. This connection may be made upon the lower or the upper portion of the leg, as found most desirable, and the straps E may be made rigid or elastic. If made rigid, the springs are entirely depended upon for the elastic action, but if the straps are made elastic they act in conjunction with the springs and produce a softer or milder pull upon the legs.

In Fig. 2 I have shown the upper and lower portions of the arms A' made rigid and hinged or journaled to the shaft, as before described, having a section at $A^2$ made elastic. I have also shown a boot of considerable length attached to the horse's leg, and having upon the outside a vertical steel rod G, upon which a traveler-ring H is fitted to move up and down. The strap E' is connected with this traveler-ring, and as the arms A' are connected with the shaft, which is below the line of the horse's hips or shoulders, about which the movement of the legs takes place, it will be manifest that the motion of the legs about one center and the arms A' about another center, as well as the lifting and putting down of the horse's feet, will produce a certain difference of movement between the swinging of the arms A' and the horse's legs, and this difference is properly compensated by the up-and-down motion of the traveler H.

In Fig. 3 I have shown the arm $A^3$ hinged to the outer end of the journal-shaft B' and having a movement outwardly or approximately at right angles with the journal-shaft. A spring I of any suitable character, either flat or spiral, is fixed to an arm J, which projects from the shaft B and presses against the rigid arm $A^3$ at some point, so as to force it outward with any desired degree of tension. The lower end of the arm is connected with the horse's leg, as previously described. Holes L are made in the outwardly-projecting arm or extension of the journal-shaft, and the arm $A^3$ may be pivoted or hinged in either one of these holes, and the outward pressure of the spring I upon it will thus be increased or diminished according to the position of the arm.

In Fig. 4 I have shown the clamping-disks M attached to the outer end of the journal-shaft $B^3$, and in this case the arm $A^4$ extends between the two disks and is clamped between them by screwing up a nut N or set-screw, which clamps the disks firmly together upon the rod, and thus holds it at any desired angle with relation to the rotary shaft B. This adjustment achieves the same purpose as that previously described in regulating the tension and outward pull upon the legs of the horse. The same result may be effected by attaching two elastic arms A⁵ to the shaft C², as shown in Fig. 5, and connecting their lower ends by a horizontal rod O. In this case P is a traveler adapted to move backward and forward upon this rod, the arms A⁵ having only a limited swing to permit this movement, the said traveler being connected with the horse's leg, as before described, by the strap E².

It will be manifest that this device or any modification of it may be secured to the shafts at any point in their length so as to stand opposite the front and hind legs, and the application to either of the legs separately or in pairs may be made at will. As the journal-boxes are clamped upon the shafts, it will be easy to adjust them to suit the peculiarities of any horse to which the device is to be applied, the essence of the invention being contained in the arms connected with the shafts and having an outward elastic pull, which is communicated to the horse's legs by connecting rigid or elastic straps, as before described. If connected to both the hind and fore legs at the same time, it will be seen that it can be used to great advantage, regulating the action of a pacing horse, or for converting a trotter or a mixed-gaited horse into a pacer, by holding the distance between the hind and fore legs the same distance apart by a regular and mild tension and at the same time inclining them outward when off the ground, clearing the other two legs, which always stand under the body at this time in a pacer.

Having thus described my invention, what I claim as new, and desire to secure by Letters Patent, is—

1. In a spreader for horses, journal-boxes fixed to the vehicle-shafts in a normally-horizontal axial line, spring-actuated arms with journals turning in said boxes, straps connecting the lower ends of the arms with the horse's legs, said arms laterally adjustable with relation to the shafts, whereby the outward pull or tension of the arms is regulated without changing the axis of rotation of the journals, substantially as herein described.

2. In a spreader for horses, journal-boxes fixed to the vehicle-shafts, spring-actuated arms with journals turning in the boxes and having a horizontal axial line of rotation, leg attachments and connections between the lower ends of the arms and the horse's legs, and a traveler connected with the leg attachments to compensate for the difference between the movements of the leg and swinging arm, substantially as herein described.

3. In a spreader for horses, spring-actuated swinging arms attached to the vehicle-shafts in pairs upon each side, straps connecting the arms upon each side with one front and one hind leg, and intermediate horizontal connecting-bars uniting the arms upon each side, whereby both legs upon either side are caused to move in unison, substantially as herein described.

In witness whereof I have hereunto set my hand.

JAMES R. PHELPS.

Witnesses:
S. H. NOURSE,
H. F. ASCHECK.